(12) United States Patent
Sprang et al.

(10) Patent No.: US 11,999,386 B2
(45) Date of Patent: Jun. 4, 2024

(54) USER INTERFACES FOR AUTONOMY STATE CONTROL AND ALERTS

(71) Applicant: Stack AV Co., Mount Pleasant, PA (US)

(72) Inventors: Ralph A. Sprang, Pittsburgh, PA (US); Dennis Jeffrey Hoff, South Park Township, PA (US); Brad Allen Dranko, Pittsburgh, PA (US); Tekin Alp Meriçli, Pittsburgh, PA (US); Michael David George, Pittsburgh, PA (US)

(73) Assignee: Stack AV Co., Mount Pleasant, PA (US)

( * ) Notice: Subject to any disclaimer, the term of this patent is extended or adjusted under 35 U.S.C. 154(b) by 0 days.

(21) Appl. No.: 17/588,689

(22) Filed: Jan. 31, 2022

(65) Prior Publication Data
US 2023/0242161 A1    Aug. 3, 2023

(51) Int. Cl.
*B60W 60/00*    (2020.01)
*B60W 10/04*    (2006.01)
(Continued)

(52) U.S. Cl.
CPC .......... *B60W 60/005* (2020.02); *B60W 10/04* (2013.01); *B60W 10/18* (2013.01); *B60W 10/20* (2013.01); *B60W 50/082* (2013.01); *B60W 50/14* (2013.01); *B60R 16/023* (2013.01); *B60W 2050/143* (2013.01); *B60W 2050/146* (2013.01); *B60W 2540/10* (2013.01); *B60W 2710/18* (2013.01); *B60W 2710/20* (2013.01); *G08B 7/06* (2013.01)

(58) Field of Classification Search
CPC .... B60W 60/005; B60W 10/04; B60W 10/18; B60W 10/20; B60W 50/082; B60W 50/14; B60W 2050/143; B60W 2050/146; B60W 2540/10; B60W 2710/18; B60W 2710/20; B60R 16/023; G08B 7/06
USPC ......................................................... 701/23
See application file for complete search history.

(56) References Cited

U.S. PATENT DOCUMENTS 10,564,638 B1    2/2020    Lockwood et al.
11,474,519 B2   10/2022   Hicok et al.
(Continued)

FOREIGN PATENT DOCUMENTS

CA    3127823 A1 *   7/2020   .......... B60W 60/001
EP    3647134 A1 *   5/2020   ................ B60T 7/20
(Continued)

OTHER PUBLICATIONS

"Practical Autonomous Trucking for Today".locomation.ai, Nov. 28, 2020, retrieved on Feb. 19, 2022. Retrieved from URL:https://web.archive.org/web/20201128145637/https://locomation.ai/; 2 pages.
(Continued)

*Primary Examiner* — Tuan C To
(74) *Attorney, Agent, or Firm* — Morrison & Foerster LLP (57) ABSTRACT

In some scenarios, the approach may be used with two or more vehicles travelling in formation where selected vehicles may be fully or partially autonomously controlled. Information is collected at each vehicle and from the drivers and it is shared with other vehicles and drivers to make a collective decision to enter or leave autonomy.

21 Claims, 9 Drawing Sheets

(51) Int. Cl.
- B60W 10/18 (2012.01)
- B60W 10/20 (2006.01)
- B60W 50/08 (2020.01)
- B60W 50/14 (2020.01)
- B60R 16/023 (2006.01)
- G08B 7/06 (2006.01)

(56) References Cited

U.S. PATENT DOCUMENTS

| | | |
|---|---|---|
| 2010/0110523 A1 | 5/2010 | Varaprasad et al. |
| 2014/0346823 A1 | 11/2014 | Stebbins et al. |
| 2015/0015479 A1 | 1/2015 | Cho |
| 2016/0267796 A1 | 9/2016 | Hiroma et al. |
| 2017/0088143 A1 | 3/2017 | Goldman-Shenhar et al. |
| 2017/0192423 A1 | 7/2017 | Rust et al. |
| 2017/0277194 A1 | 9/2017 | Frazzoli et al. |
| 2017/0344023 A1 | 11/2017 | Laubinger et al. |
| 2018/0107214 A1* | 4/2018 | Chandy ............... B60W 40/08 |
| 2018/0136651 A1 | 5/2018 | Levinson et al. |
| 2018/0211545 A1 | 7/2018 | Smartt et al. |
| 2018/0272944 A1 | 9/2018 | Goncalves |
| 2019/0086914 A1 | 3/2019 | Yen et al. |
| 2019/0132709 A1 | 5/2019 | Graefe et al. |
| 2019/0179341 A1 | 6/2019 | Switkes et al. |
| 2019/0191127 A1 | 6/2019 | Koravadi |
| 2019/0387060 A1 | 12/2019 | Kentley-Klay et al. |
| 2020/0039506 A1 | 2/2020 | Woodbury et al. |
| 2020/0041994 A1 | 2/2020 | Alalao et al. |
| 2020/0057453 A1 | 2/2020 | Laws et al. |
| 2020/0156627 A1 | 5/2020 | Wieschemann et al. |
| 2020/0166361 A1* | 5/2020 | Voznesensky ......... G01C 21/28 |
| 2020/0189583 A1 | 6/2020 | Tatourian |
| 2020/0207371 A1 | 7/2020 | Dougherty et al. |
| 2020/0226857 A1* | 7/2020 | Voznesensky ......... G08G 1/202 |
| 2020/0240800 A1* | 7/2020 | Voznesensky ... G08G 1/096833 |
| 2020/0282990 A1 | 9/2020 | Sato |
| 2020/0342693 A1 | 10/2020 | Jiang et al. |
| 2020/0402409 A1 | 12/2020 | Shida et al. |
| 2021/0024100 A1* | 1/2021 | Calleija ................. G08G 1/202 |
| 2021/0109544 A1 | 4/2021 | Rakshit et al. |
| 2021/0148715 A1 | 5/2021 | Atanasiu et al. |
| 2021/0181762 A1 | 6/2021 | Zhao et al. |
| 2021/0240201 A1 | 8/2021 | Okuyama et al. |
| 2021/0356965 A1* | 11/2021 | Forster ................ G05D 1/0212 |
| 2022/0060870 A1 | 2/2022 | Karl |
| 2022/0108618 A1 | 4/2022 | Kumar et al. |
| 2022/0126878 A1 | 4/2022 | Moustafa et al. |
| 2022/0155082 A1* | 5/2022 | Toshniwal ......... G01C 21/3446 |
| 2022/0161816 A1 | 5/2022 | Gyllenhammar |
| 2022/0189307 A1 | 6/2022 | Shmueli Friedland et al. |
| 2022/0198936 A1 | 6/2022 | Meriçli et al. |
| 2022/0198937 A1 | 6/2022 | Meriçli et al. |

FOREIGN PATENT DOCUMENTS

| | | | |
|---|---|---|---|
| WO | WO-2017040689 A1 * | 3/2017 | ........... B60R 16/005 |
| WO | WO-2020205597 A1 * | 10/2020 | ........... B60W 40/09 |
| WO | 2020/252227 A1 | 12/2020 | |

OTHER PUBLICATIONS

Dey et al. "Distance-Dependent eHMIs for the Interaction Between Automated Vehicles and Pedestrians," 12th International Conference on Automotive User Interfaces and Interactive Vehicular Applications, Sep. 2020; pp. 192-204. Retrieved from URL:https://doi.org/10.1145/3409120.3410642.

Fong, T. (Nov. 2001). "Collaborative Control: A Robot-Centric Model for Vehicle Teleoperation," The Robotics Institute, Carnegie Mellon University (CMU-RI-TR-01-34); 198 pages.

Huang et al. (Mar. 2009). "Finding Multiple Lanes in Urban Road Networks with Vision and Lidar," Autonomous Robots, 26: 103-122.

International Search Report and Written Opinion mailed Mar. 18, 2022, directed to International Application No. PCT/US2021/063447; 15 pages.

Meriçli et al., U.S. Office Action mailed Apr. 5, 2023, directed to U.S. Appl. No. 17/507,935; 25 pages.

Meriçli et al., U.S. Office Action mailed May 19, 2023, directed to U.S. Appl. No. 17/528,302; 24 pages.

Meriçli et al., U.S. Office Action mailed Sep. 12, 2023, directed to U.S. Appl. No. 17/528,302; 19 pages.

Meriçli et al., U.S. Office Action mailed Sep. 19, 2023, directed to U.S. Appl. No. 17/507,935; 17 pages.

Triller. (Jan. 2009). "A Cooperative Behaviour Model for Autonomous Robots in Dynamic Domains," University of Kassel; pp. 1-107.

Tsugawa et al. (Mar. 2016). "A Review of Truck Platooning Projects for Energy Savings," IEEE Transactions on Intelligent Vehicles 1(1): pp. 68-77.

* cited by examiner

USER INTERFACES FOR AUTONOMY STATE CONTROL AND ALERTS

CROSS REFERENCE TO RELATED APPLICATIONS

This patent application relates a U.S. patent application entitled "SHARED CONTROL FOR VEHICLES TRAVELLING IN FORMATION" Ser. No. 17/507,935 filed Oct. 22, 2021, which in turn claims the benefit of a provisional application entitled "SHARED CONTROL FOR VEHICLES TRAVELLING IN FORMATION" Ser. No. 63/128,961 filed Dec. 22, 2020, the entire contents of each of which are hereby incorporated by reference.

TECHNICAL FIELD

This application relates to systems and methods for conveying vehicle autonomy states to a driver via visual and/or audio messaging. It also relates to systems and methods for enabling a driver to control and manage transitions into, out of, and between autonomy modes. The system can provide advanced notice of impending autonomy mode changes, and warn of system failures.

BACKGROUND

Researchers and vehicle manufacturers have been developing self-driving technologies for many years. Commercial trucking continues to be one of the areas where autonomous vehicles will eventually become widespread. Sensors and/or wireless connections (such as vehicle-to-vehicle radio communication) can be used by such autonomous systems to follow a route, and locate and avoid other vehicles and obstacles and follow the road. However, safety considerations require user interfaces for such vehicles that remain complex and difficult to use for many drivers.

SUMMARY

In an example implementation, a vehicle such as a truck may be controlled by both a human driver and autonomy logic. The vehicle is therefore equipped with the usual throttle pedal, brake pedal and steering wheel for a human to operate. Electronic actuator devices are coupled to these human-controlled inputs. The electronic actuators in turn operate the vehicle's throttle, brake and steering sub-system mechanisms.

The vehicle also includes autonomy logic that may follow lanes, or a pre-defined plan or which generates a plan for controlling the vehicle such as the path it should follow. The autonomy logic uses inputs from sensors such as cameras, lidars, radars, and data available from other inputs such as radios and position sensors to devise the plan. The autonomy logic also provides an autonomy ready signal when it is able to transition into an autonomy mode based on its sensors and other inputs.

Autonomy control inputs are then generated to operate the throttle, brake, and steering sub-systems based on the plan. The controller also assesses the readiness of the actuators to accurately operate the vehicle's throttle, brake and steering sub-systems.

In some arrangements, a system controller receives both the human control inputs and the autonomy control inputs. These control inputs may be fed to a set of relays. The controller also receives the autonomy ready and actuator ready signals. The controller operates the relays to select which outputs to provide to an Electronic Control Unit (ECU) which in turn generates signals to be applied to the throttle, brake and steering actuators. The controller determines whether to set the relays to choose the human control inputs or autonomy control inputs based on several conditions such as the ready signals and/or other inputs such as human-operated mode input(s) and a human-operated stop input. In addition to switching between human and machine control, these relays can also indicate safety interlocks. For example, the control inputs may be fed to a set of electronic switches, relays, or equivalent devices to enable switching between manual and autonomous control. However, these control inputs may also be fed to a set of interlock devices to enable safe operation of the system.

The controller may also provide autonomy related information to the human driver via lights, tones, audio outputs and/or display screens associated with the autonomy system status, including state transitions into and out of autonomy modes. This information may include details such as whether the autonomy system is armed or disarmed, or in a pre-arm state and whether the autonomy logic is ready or not. The controller may also accept inputs from the driver to engage or disengage autonomy modes or enable only selected autonomy modes.

DETAILED DESCRIPTION OF ILLUSTRATIVE EMBODIMENT(S)

Figure 1:
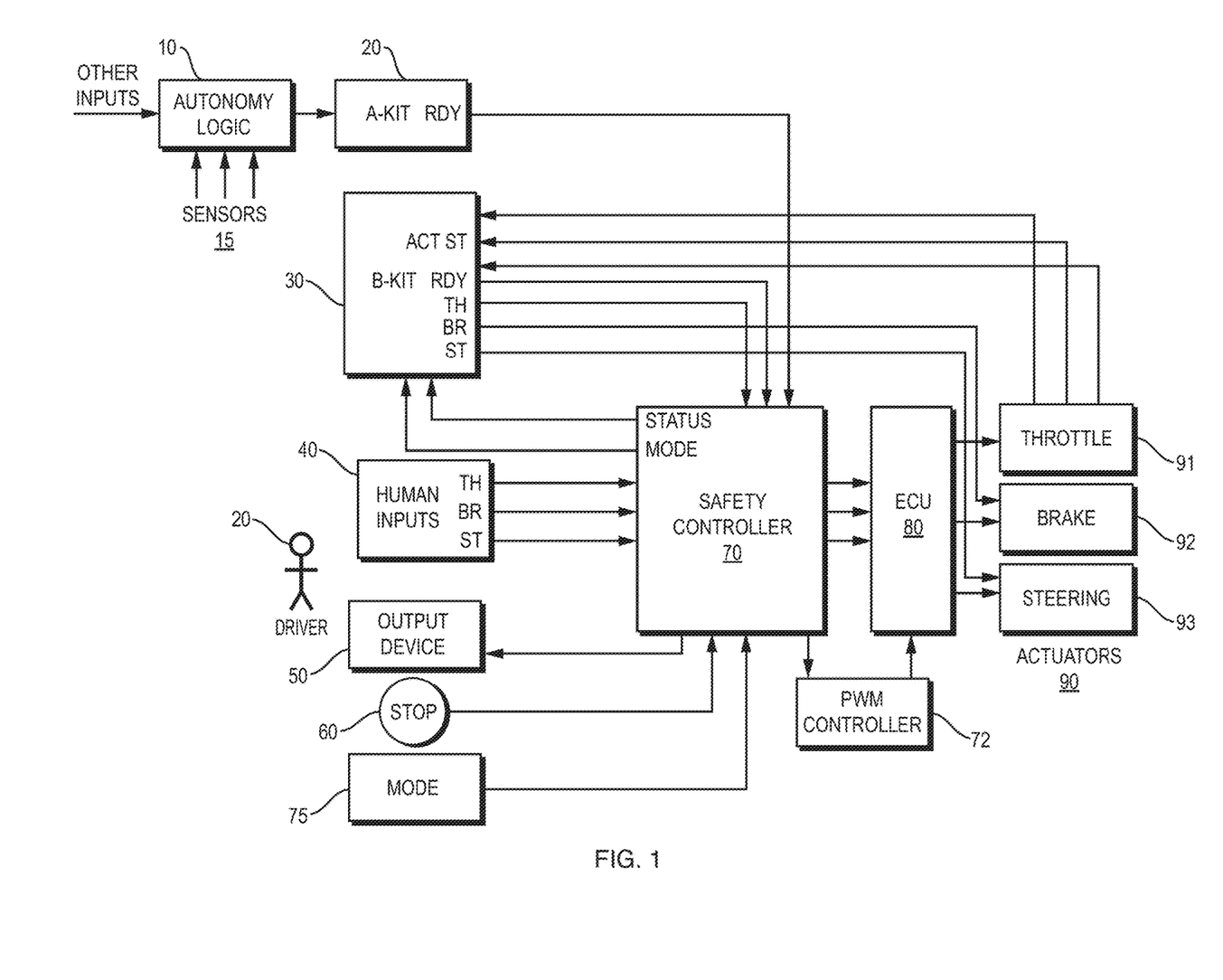
FIG. 1 is a high level diagram of the components of a system that implements controlled transitions into and out of autonomy state and provides corresponding driver alerts.

As shown more particularly in FIG. 1, a vehicle can be driven by either autonomy logic 10 or a human driver 20.

The human driver 20 provides inputs to the system controller 70 via typical human input devices 40 such as a throttle pedal, brake pedal and steering wheel. It should be understood that the reference to a "throttle" herein does not mean the vehicle must be driven by an internal combustion engine. The vehicle may be propelled by electric motors or other alternatives to fossil fuels.

The human driver 20 can also view a display 50 and operate other inputs such as stop button 60 or mode input 75.

The autonomy logic 10 receives inputs from sensors 15 such as one or more camera(s), lidar(s), radar(s), position sensor(s), and/or receive data from other sources via radio(s)

and other inputs. The autonomy logic 10 produces autonomy control signals including throttle, brake and steering signals. outputs to the controller 70.

The autonomy logic 20 may include an A-kit module 20 and a B-kit module 30.

The A-kit module 20 is responsible for generating instructions that describe a plan for the vehicle, such as a path that it should follow. The A-kit module also provides a ready signal when the autonomy logic 10 determines that it has sufficient information to devise and approve of a plan for the vehicle to be autonomously driven.

The B-kit module 30 receives inputs from the autonomy logic 10, such as instructions from the A-kit (including a path to follow) and produces autonomy control signals (for example including throttle, brake and steering control input signals) to the controller 70.

The controller 70 receives human control inputs 40 from the human driver 20 and autonomous control inputs from the B-kit module 30, and feeds at least the throttle to a Pulse Width Modulated (PWM) relay (not shown). The relay can select which of the inputs are fed to the vehicle's Electronic Control Unit (ECU) 80. Steering and brake inputs may be controlled over a Controller Area Network (CAN) bus.

The ECU 80 in turn produces electronic control signals used by one or more actuators 90 which may include the vehicles throttle 91, brake 92 and steering 93 actuators that in turn operate the physical throttle, brake and steering sub-systems on the vehicle. In some implementations the ECU may not control one or more of the actuators, such as the steering 93.

The controller 70 may also receive inputs from actuators 90 that indicate their current status.

In some implementations the controller 70 may provide visual or audio alerts outputs to the output device(s) 50. The output device(s) may include indicator lights and/or a speaker and electronics that can playback pre-recorded audio messages.

The controller 70 may also receive inputs such as from the stop button 60 and or mode switch 75 as operated by the driver 20.

Figure 2:
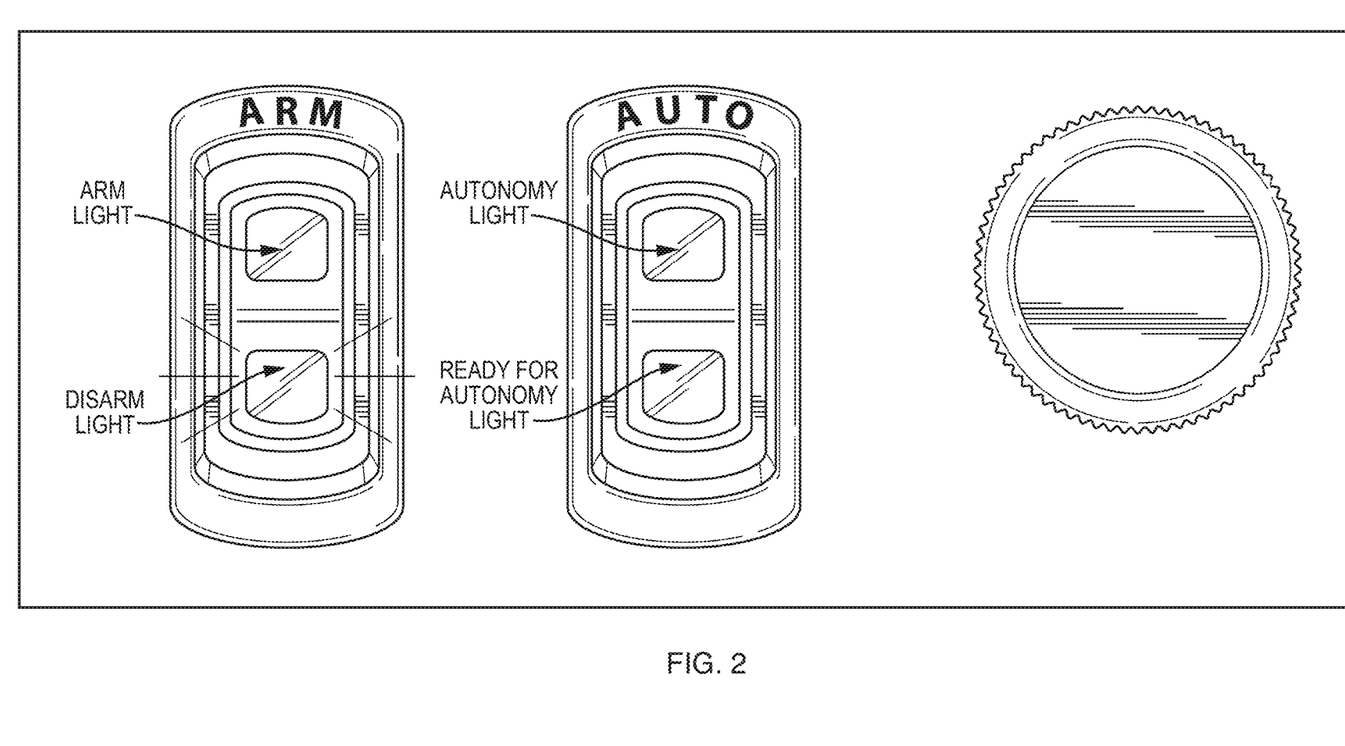
FIG. 2 is an example user interface including two rocker switches, four lights and a stop button.

FIG. 2 is an example of an operator interface which may provide portions of the output device 50 and stop button 60. Here the display may consist of four lights including an arm light, autonomy light, disarm light and ready for autonomy light. The logical operation of these lights will be explained in more detail below. These four lights maybe put on or formed as part of mode input devices 75 such as the rocker switches shown.

The autonomy controller 70 may assume a number of states as follows:

Pre-disarm—The system enters this state on startup and remains in this state until the B-Kit signals it is active and ready.

Disarm—The system is disengaged but the B-Kit is ready to arm the system. The human operated inputs 40 are controlling the actuators 90 and the rest of the system should not interfere with truck operation.

Arm—The system's low level controls are engaged but only track the human inputs 40 and generate the corresponding control signals.

Ready for Autonomy—The A-Kit is ready to enter full autonomy but the system is otherwise functionally still in the Arm state.

Autonomy—The human inputs 40 are inactive and the vehicle is controlled by the B-Kit as directed by the A-Kit.

E-Stop—E-stop has been pressed and autonomy system is deactivated, with the human inputs exclusively controlling the vehicle.

Table 1 below lists the various controls and outputs for each of these states in more detail. The "Driver Alert System" referenced in Table 1 may include the output device 50 such as the electronics and speaker that play back pre-recorded audio messages. The "PWM controller" referenced in the table is portion of controller 70 that manages the autonomous control of the throttle and selection of the manual or autonomous throttle inputs.

TABLE 1

| | |
|---|---|
| E-Stop | PWM throttle relay is powered down to connect throttle pedal to ECU. Safety Controller, B-Kit, and A-Kit are powered down. Disarm, Arm, Ready for Autonomy, and Autonomy lights are turned off. |
| Pre-disarm | PWM throttle relay is powered up and connects throttle pedal to ECU through the PWM controller. The PWM controller passes the input throttle signals directly to the outputs to the ECU to electronically mimic a wired connection. Disarm, Arm, Ready for Autonomy, and Autonomy lights are turned off. B-Kit software inhibits CAN communication to avoid affective truck operation. Driver Alert System is silent |
| Disarm | PWM throttle relay is powered up and connects throttle pedal to ECU through the PWM controller. The PWM controller passes the input throttle signals directly to the outputs to the ECU to electronically mimic a wired connection. Amber Disarm light is turned on. Arm, Ready for Autonomy, and Autonomy lights are turned off. B-Kit software inhibits CAN communication to avoid affective truck operation. Driver Alert System is silent |
| Arm | PWM throttle relay is powered up and connects throttle pedal to ECU through the PWM controller. The PWM controller reads the throttle pedal signals, converts them to a percentage throttle, sends that percentage throttle to the PWM signal generator, and generates the output signal that is sent to the ECU. This process permits throttle pedal control while demonstrating that the PWM signal generation system that will be used for autonomy is functional. Green Arm light is turned on. Disarm, Ready for Autonomy, and Autonomy lights are turned off. B-Kit software enables CAN communication. Driver Alert System is silent |

TABLE 1-continued

| | |
|---|---|
| Ready for Autonomy | PWM throttle relay is powered up and connects throttle pedal to ECU through the PWM controller. The PWM controller reads the throttle pedal signals, converts them to a percentage throttle, sends that percentage throttle to the PWM signal generator, and generates the output signal that is sent to the ECU. This process permits throttle pedal control while demonstrating that the PWM signal generation system that will be used for autonomy is functional.<br>Green Arm light is turned on.<br>Amber Ready for Autonomy light is flashing at a slow rate.<br>Ready for Autonomy, and Autonomy lights are turned off.<br>B-Kit software enables CAN communication.<br>Driver Alert System repeatedly plays the Ready for Autonomy message with a pause between repeats. |
| Autonomy | PWM throttle relay is powered up and connects throttle pedal to the PWM controller. The PWM controller ignores the throttle pedal signal. The PWM controller receives a percentage throttle command from the B-Kit, sends that percentage throttle to the PWM signal generator, and generates the output signal that is sent to the ECU.<br>Green Arm light is turned on.<br>Green Autonomy light is turned on.<br>Disarm and Ready for Autonomy lights are turned off.<br>B-Kit software enables CAN communication.<br>A-Kit generates a polynomial describing vehicle path and sends that polynomial to the B-Kit.<br>B-Kit controls steering, brake and throttle based on polynomial received from the A-Kit.<br>Driver Alert System plays the Autonomy message one time. |

It should be understood the table above is but one example. In other implementations, modes can be set to cause either the human inputs to be inactive, the human inputs add to the autonomous inputs, or the human inputs cause an exit from the autonomous control when activated.

Figure 3:
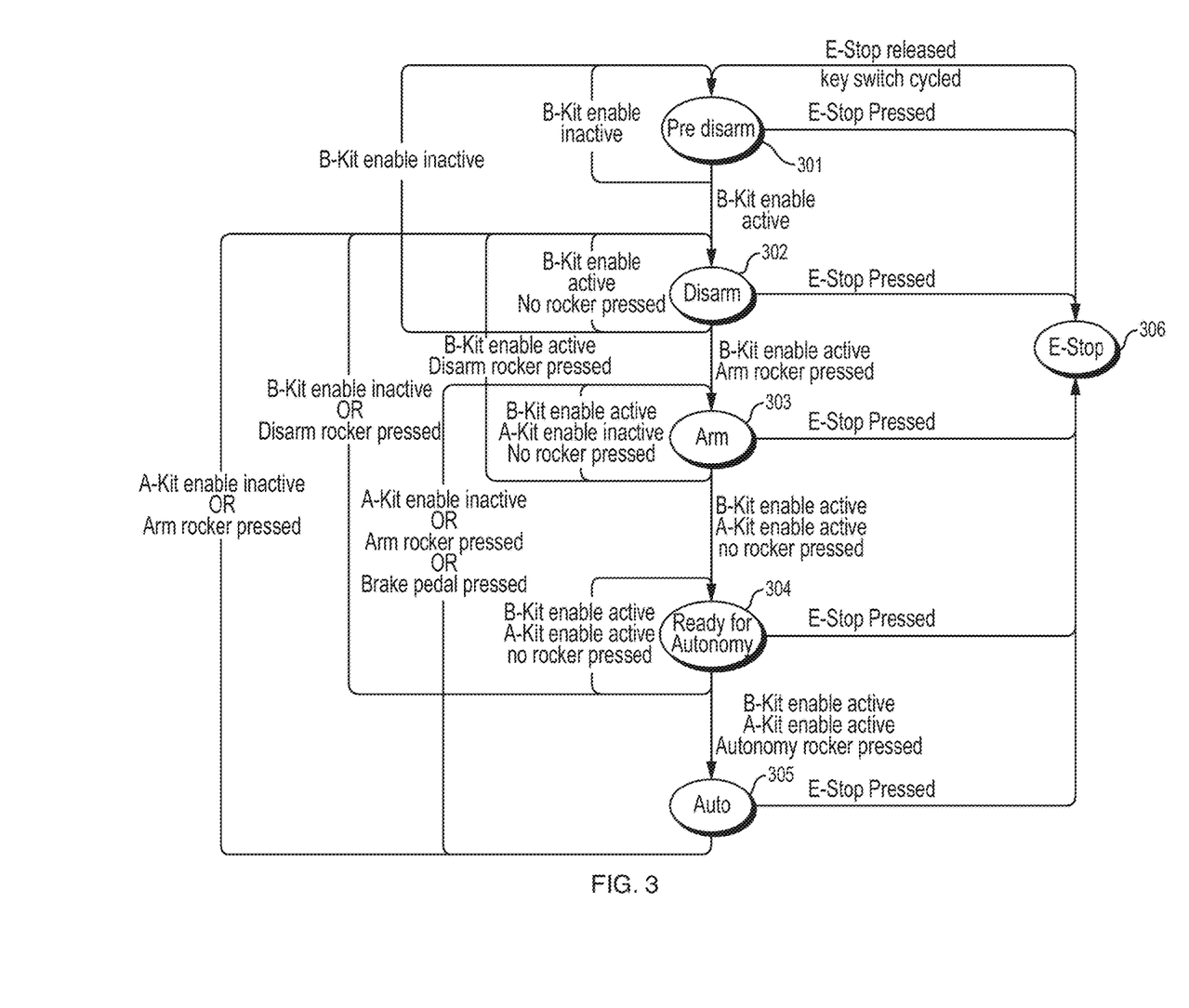
FIG. 3 is an example autonomy state transition diagram.

FIG. 3 is a detailed diagram showing transitions between the pre-disarm 301, disarm 302, arm 303, ready for autonomy 304 autonomy 305, and E-stop 306 states.

Briefly, pressing the E-stop button 60 in any state causes the system to enter the E-stop 306 state. When E-stop is released, the system enters pre-disarm 301. The system remains in this state until the B-kit ready signal (referred to as "B-kit enable in FIG. 3) is active, where then disarm 302 state is entered. The system enters arm 303 when the B-kit enable is active and the arm rocker (FIG. 2) is pressed. The system enters ready for autonomy 304 when both B-kit and A-kit are ready. The system does not enter autonomy 305 until both A-kit and B-kit are ready and the autonomy rocker is pressed.

Conditions causing an exit from any of the states are also shown in FIG. 3. For example, when in autonomy mode 305, the A-kit ready goes inactive but B-kit ready remains active, then arm 303 may be entered. Autonomy mode 305 may also exit to arm mode 303 if the arm rocker is switched to the off position or the brake pedal is pressed.

In another example, if at any time the B-kit ready or A-kit ready signal goes inactive, the disarm 302 is entered. Likewise, if the arm rocker is moved to the disarm position, then disarm 302 is entered.

Tables 2-1 and 2-2 provide more details list of the types of exceptions other events that may initiate transitions from one state to another.

TABLE 2-1

Exception Events

| Exception Event | Results, Outputs, Controls |
|---|---|
| E-Stop pressed | System enters E-Stop state and powers down |
| Brake pedal pressed | System enters Arm state<br>Driver Alert System plays the Manual Takeover message |
| Steering wheel manually turned | System enters Disarm state<br>Driver Alert System is silent |
| System cannot maintain autonomy - A-Kit enable becomes inactive | System enters Arm state<br>Driver Alert System plays Take Control message repeatedly until the system state changes |

TABLE 2-2

System State Transition Table

| Current State | Next State | Inputs or Conditions | Comments |
|---|---|---|---|
| Any State | E-Stop | E-Stop is pressed | E-Stop must be released and system must be restarted to return to normal operation. |
| E-Stop | Pre-disarm | E-Stop is released Key switch is cycled | System powers up and enters Pre-disarm state. |
| Pre-disarm | Pre-disarm | B-Kit enable not active | System remains in Pre-disarm state. |
| Pre-disarm | Disarm | B-Kit enable active | System enters Disarm state |

TABLE 2-2-continued

System State Transition Table

| Current State | Next State | Inputs or Conditions | Comments |
|---|---|---|---|
| Disarm | Disarm | B-Kit enable active<br>Arm button is not pressed | System remains in Disarm state. |
| Disarm | Arm | B-Kit enable active<br>Arm rocker switch is pressed momentarily | System enters Arm state. |
| Arm | Arm | B-Kit enable active<br>No rocker switch pressed | System remains in Arm state. |
| Arm | Disarm | B-Kit enable active<br>Disarm rocker switch is pressed momentarily | System returns to Disarm state |
| Arm | Ready for Autonomy | B-Kit enable active<br>A-Kit enable is active<br>No rocker switch pressed | System enters Ready for Autonomy state |
| Ready for Autonomy | Ready for Autonomy | B-Kit enable active<br>A-Kit enable is active<br>No rocker switch pressed | System remains in Ready for Autonomy state |
| Ready for Autonomy | Autonomy | B-Kit enable active<br>A-Kit enable is active<br>Autonomy rocker switch is pressed momentarily | System enters Autonomy state |
| Ready for Autonomy | Arm | A-Kit enable becomes inactive OR<br>Arm rocker switch is pressed momentarily | System returns to Arm state |
| Ready for Autonomy | Disarm | B-Kit enable becomes inactive OR<br>Disarm rocker switch is pressed momentarily | System returns to Disarm state |
| Autonomy | Autonomy | B-Kit enable active<br>A-Kit enable is active<br>No rocker switch is pressed | System remains in Autonomy state |
| Autonomy | Arm | A-Kit enable becomes inactive OR<br>Arm rocker switch is pressed momentarily<br>OR<br>Brake is pressed<br>OR<br>Driver applies torque to steering wheel | System returns to Arm state |
| Autonomy | Disarm | B-Kit enable becomes inactive OR<br>Disarm rocker switch is pressed momentarily | System returns to Disarm state |
| Autonomy | Ready for Autonomy | A-Kit enable becomes inactive then becomes active again | System returns to Ready for Autonomy state |

The controller 70 may also accept inputs from a mode switch 75. The mode switch may be a three position switch corresponding to three system states: normal, steering only, and speed only. The mode switch 75 outputs may be fed to the controller 70 to control autonomy system modes as shown in Table 3.

TABLE 3

System Modes

| Mode | Description | Conditions |
|---|---|---|
| Normal | System control of brake, throttle, and steering is enabled, subject to system state. | The Mode Switch can be turned while the system is operating but the change in mode will not change system mode until the system is power cycled. |
| Steering Only | System control of brake and throttle is disabled and only the driver can control brake and throttle<br>System control of steering is enabled, subject to system state. | The Mode Switch can be turned while the system is operating but the change in mode will not change system mode until the system is power cycled. |

TABLE 3-continued

System Modes

| Mode | Description | Conditions |
| --- | --- | --- |
| Speed Only | System control of brake and throttle is enabled, subject to system state. System control of steering is disabled and only the driver can control steering. | The Mode Switch can be turned while the system is operating but the change in mode will not change system mode until the system is power cycled. |

Coordinating Autonomy State Transitions with Other Vehicles

It can now be understood how the above system and method can be used to improve how the driver may better control and remain informed of the state of the vehicle's autonomy logic. However in some instances the autonomy state of other vehicles may also be of importance. One such scenarios is where one or more drivers are responsible for two or more semi-trucks traveling together in a convoy. The multiple trucks, multiple human drivers and multiple autonomy logics should each be informed of what the other is doing.

Consider for example where the human interface should keep the driver informed of transitions into and out of autonomy mode. When one vehicle is about to transition into the autonomy state, the driver of another vehicle may want to be at least alerted to that fact. In other scenarios, where safety may be a concern, a lead driver may need to approve of any following vehicle's transition into autonomy. But cognitive or information overload should be avoided to the extent possible especially where human drivers are involved. Therefore, any interface to inform and/or obtain consent from a driver should be minimally distractive and easy to operate.

Figure 4:
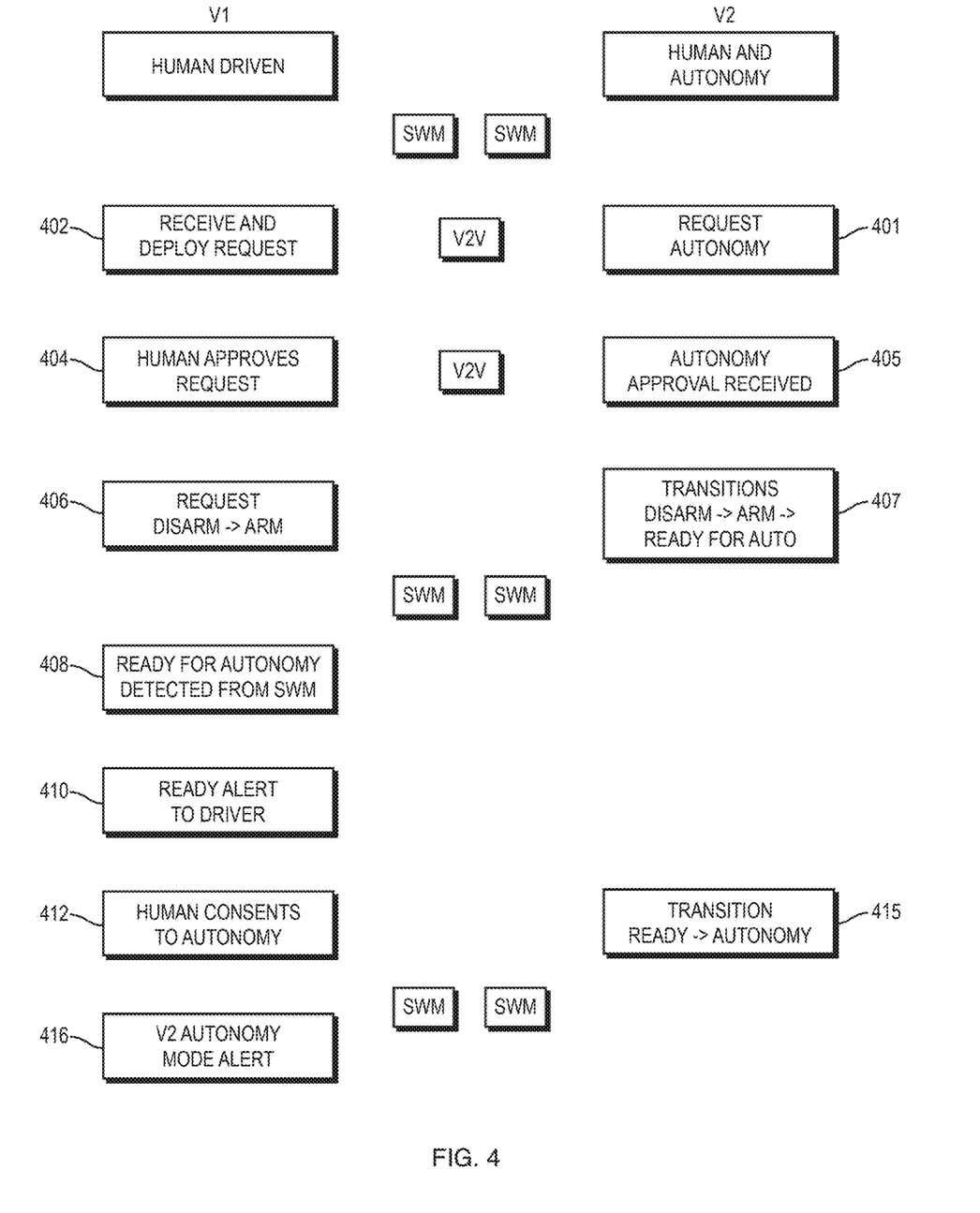
FIG. 4 is an example of collaborative transition into autonomy.

FIG. 4 is an example process flow that leverages driver interfaces and system components described in FIGS. 1-3 above. In this scenario there are two trucks, a first vehicle (V1) and a second vehicle (V2). Vehicle V1 may be human driven and the second vehicle V2 is capable of being controlled by either a human driver or by autonomy logic. Vehicle V2 therefore has, in one embodiment, at least the components shown in FIGS. 1 and 3 and a way to communicate with V1. Vehicle V1, in one embodiment, is equipped with at least the interface shown in FIG. 2, a way to communicate with V2 and a controller.

Each of the vehicle's respective controllers may communicate with the other vehicle and share information such as via a Vehicle to Vehicle (V2V) radio link. Information may also be exchanged via a shared world model (SWM) as explained in more detail below. Information received from the V2V link or the shared world model is then leveraged to provide alerts to and obtain consent from the human driver(s).

In a first state 401, vehicle V2 requests entry into the autonomy state. This request can be conveyed over the V2V link or via updates to the SWM. In state 402 vehicle V1 receives the request from V2 and presents it to the human driver of V1. The presentation may be by playing an audio clip (e.g., "Vehicle V2 requests to enter autonomy") or by turning on a "Request for Autonomy" light.

In state 404 the human driver of V1 approves the autonomy request such as perhaps via the rocker switch of FIG. 2 or via spoken message. The approval is then passed over the V2V radio link (or via the SWM) and received at V2 in state 405.

In state 407 the controller in V2 then proceeds with the transition from the disarm state to the arm state to the ready for autonomy state (FIG. 3). The fact that V2 is now ready for autonomy is then communicated to V1, and a "Ready for Autonomy" alert is presented to the driver of vehicle V1—again either via a played back audio message or by lights.

In state 412 the human driver of V1 consents the transition by audio command or pressing a switch and this approval is communicated via the SWM or the V2V link to the controller in vehicle V2. In state 415, V2 completes the transition from the ready for autonomy state to the autonomy state. This state information again can be maintained in the SWM or updated through the V2V link. In state 416 vehicle V1 may present an autonomy mode alert to inform its driver that V2 is now operating in autonomy mode.

Figure 5:
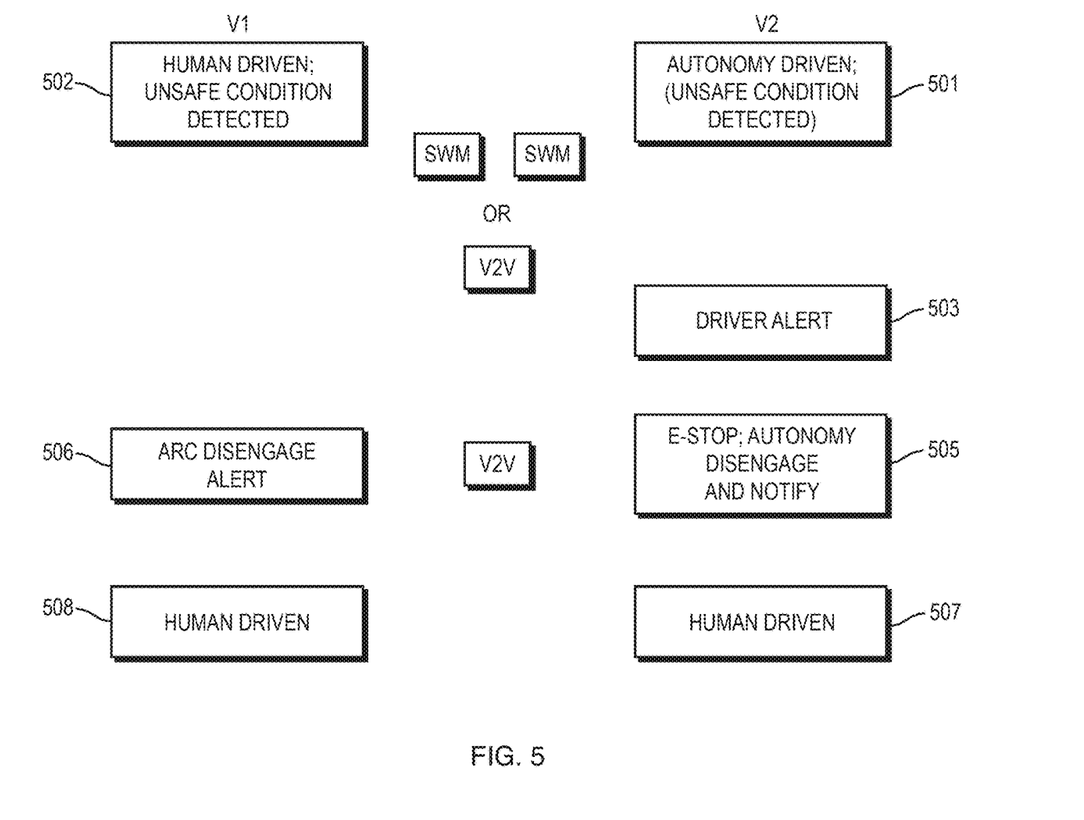
FIG. 5 is an example of collaborative notification of transition out of autonomy.

FIG. 5 shows a scenario where vehicle V2 transitions out of autonomy mode. In an initial state date 501 vehicle V2 is in an autonomy driving mode. However V2's sensors have detected an unsafe condition requiring immediate transition out of that mode. This fact is conveyed to the controller in vehicle V1 using the shared world model or more likely via a high priority message over the V2V link.

An emergency alert is presented to the driver of V1 in state 502.

In state 503 (which may occur before, after, or simultaneously with state 502) an alert is also presented to the driver of vehicle V2. E-stop mode is entered and confirmed in state 805. This e-stop status is also presented to vehicle V1 in state 506 who made turn display or play an alert to its driver. In states 806 and 808 both vehicles are human driven.

Example Implementation that Supports Collaborative Behaviors Via Shared World Model As mentioned above, a Shared World Model is one way for the drivers and autonomy logic in multiple vehicles to engage in collaborative decision-making. A detailed example implementation of such an SWM was described in the pending patent application referenced on page 1. That description is repeated here for convenience of the reader.

1.1 Information Flows

Figure 6:
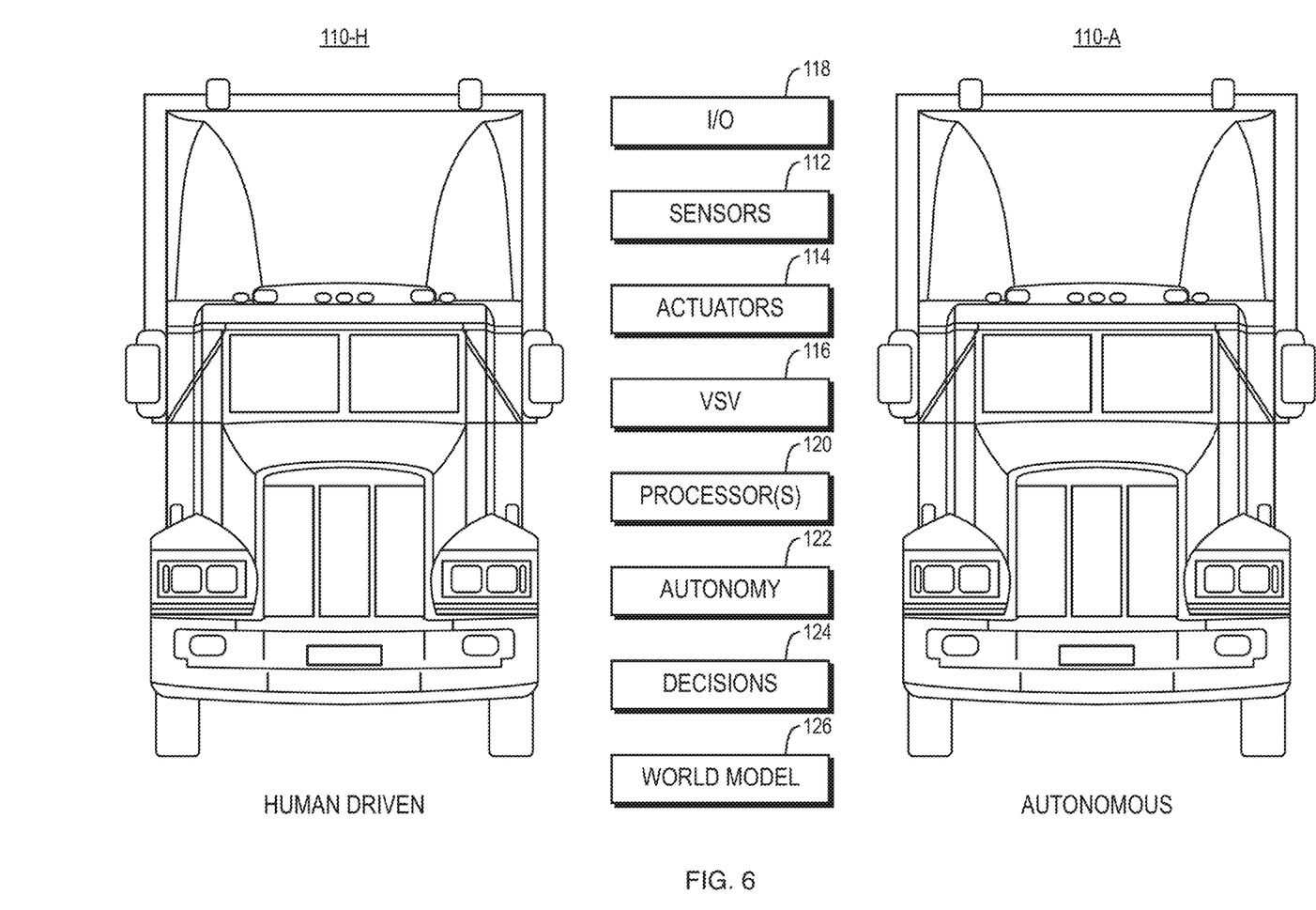
FIG. 6 shows an autonomous and a human-driven truck and some of the hardware and software systems that enable collaborative decision making via a shared world model.

FIG. 6 is a situation where two vehicles are cooperatively travelling as a unit. Both vehicles may incorporate, either when the vehicle is manufactured or in a subsequent retrofit, hardware and software that enables them to implement autonomy logic. Such autonomy logic may include algorithms to enable vehicles to drive themselves, to interact with human drivers, and to exchange information between themselves.

An example vehicle 110 may include sensors 112, actuators 114, V2V radio transceivers 116, other I/O devices 118, and one or more processors 120 (also referred to as herein as controllers 120). As discussed further herein, the one or more processors 120 may execute various logic including autonomy logic 122, decision logic 124 and may also maintain a world model 126. Vehicles 110 include human-driven vehicles 110-H and autonomous vehicles 110-A.

Figure 7:
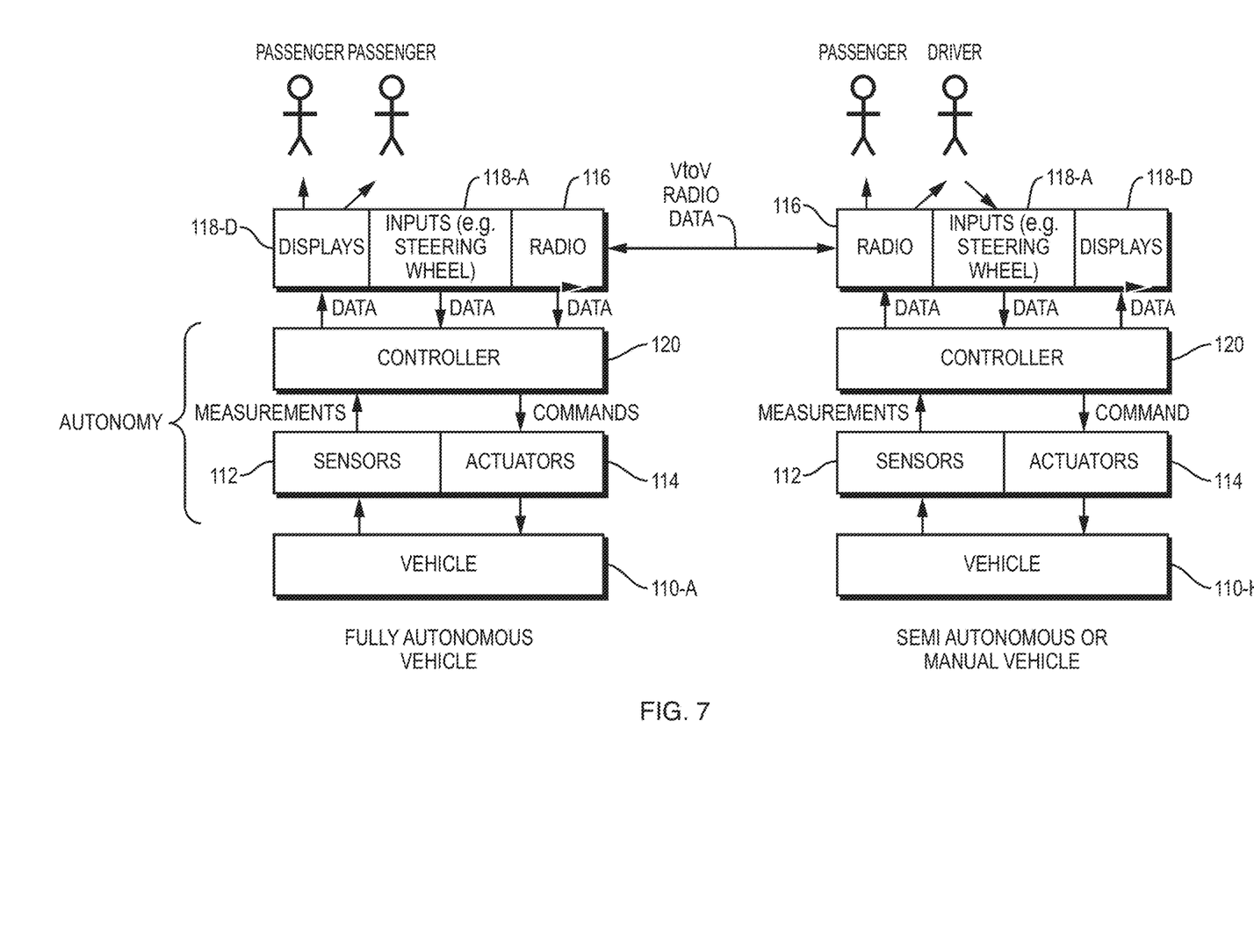
FIG. 7 is an architecture block diagram that shows the equipment that connects the controllers on two vehicles to the driver(s), sensors, actuators, and to the other vehicle.

FIG. 7 illustrates these components in more detail. Self-driving algorithms and other aspects of the autonomy logic 122 are implemented in a controller (such as one or more processors 120) that receives sensor 112 data from the respective vehicle (110-A or 110-H) and sends actuator 114 signals to the respective vehicle 110-A or 110-H. The controller 120 may further implement human interface algorithms that accept inputs (e.g., steering, throttle, touch screen etc.) via other I/O devices 118-D from human drivers while also sending data to other I/O devices 118 such as human-readable displays. The controller 120 may also send data to and accept data from vehicle-to-vehicle (V2V) radio transceiver(s) 116 to allow it to interact with humans and exchange information with the controllers 120 located in other vehicles 110.

1.2. Collaboration Via Shared Information

Figure 8:
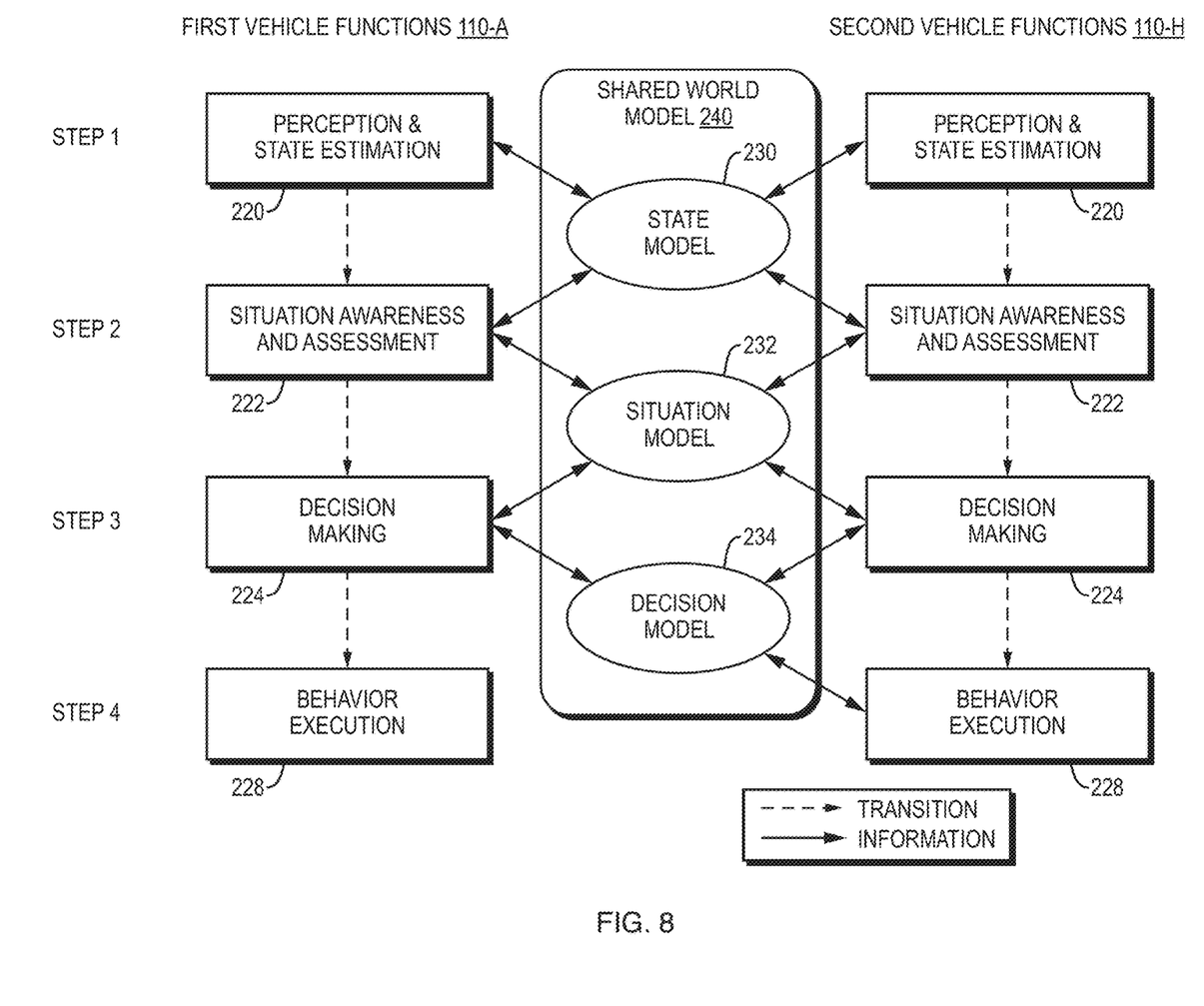
FIG. 8 is a flowchart and data flow diagram representing the process steps and information flows that enable collaboration via a shared world model.
Figure 9:
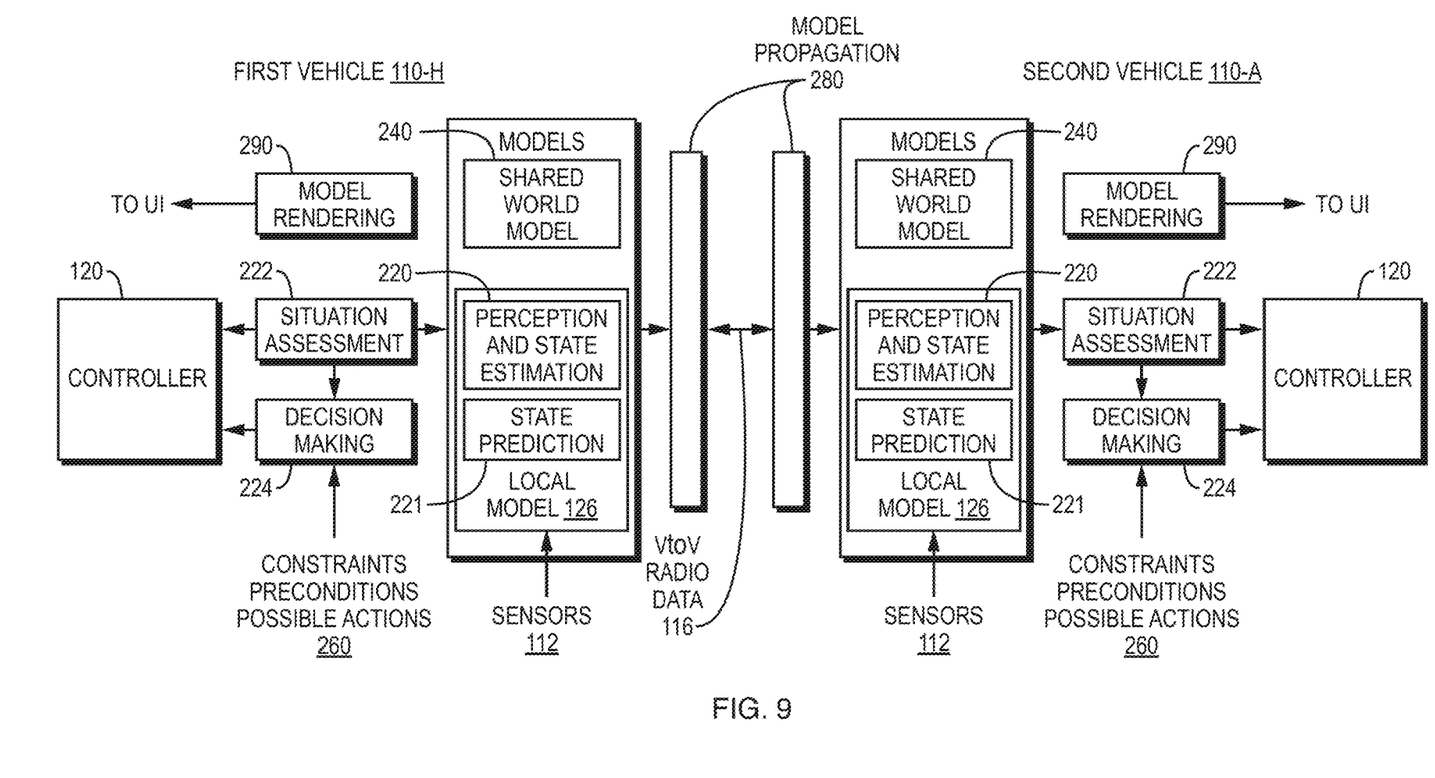
FIG. 9 is a data flow diagram that shows some major components of the autonomy controller and their data interconnections.

As shown in FIG. 8, functions that provide decision logic 124 for each vehicle 110-A, 110-H may include perception and state estimation 320, situation awareness and assessment 322, decision making 324, and behavior execution 328. The world model 126 may include a state model 330, situation model 332 and decision model 334.

The controller 120 may implement algorithms that enable driver(s) and vehicles to collaborate based on the shared information. This information typically includes sensor data originating outside the components of the computer/human system as well as derived data (states, events, constraints, conclusions) originating inside the computer/human system and data indicative of physical phenomena created by human drivers or for the purpose of being sensed by human drivers. The shared information may therefore include data that (i) originates within or outside the convoy, (ii) represents physical phenomena (such phenomena produced by or capable of being sensed by humans, such as forces on steering wheels), (iii) is received from sensors or other input devices in its raw/sensed form or (iv) is derived data (examples include states, events, constraints, conclusions, originating inside the components of autonomy logic or human control).

Each vehicle 110 will have its own local copy 126 of such shared information referred to herein as a shared world model 240. At any given instant, each local copy 126 of the shared world model 240 may not be entirely consistent with the local copy 126 on other vehicles. Nevertheless, processes residing on all controllers 120 for all vehicles 110 attempt to keep the shared information in the shared world model 240 and local copies 126 sufficiently up-to-date and consistent to permit effective collaboration. Propagation of the local copy 126 of the shared world model 240 among vehicles 110 is discussed in more detail below.

1.3. Information Processing Steps

In FIG. 8, the rectangular boxes on both left and right sides indicate an example sequence called a perceive-think-act sequence. The dotted lines represent transitions between those steps and the solid lines represent data flows between each process and components of the shared world model. As data that originates inside the computer/human system, the world model 126 (and hence also the shared world model 240) acts as another source of information to be used by the autonomy algorithms implemented in the controller 120.

The perception and state estimation step 320 may process all of the information incoming from all sources in order to derive substantially new information that describes arbitrary attributes of the vehicles, humans, and external objects and traffic, etc. Such processing may comprise operations such as, for example:

state estimation/data fusion—reducing redundant information to non-redundant form or combining relevant quantities to produce other relevant quantities (e.g. measuring space between the vehicles)

prediction—deriving later state from earlier state and a measurement (or prediction) of time (e.g. predicting time to collision based on last known speed)

The situation awareness and assessment step 322 may process all of the information incoming from all sources in order to derive substantially new information that is less directly related to sensed and communicated information, for example:

detecting events—watching and noticing when something important occurs (e.g. car in blind spot)

constraint propagation—deriving constraints from other information (e.g. do not change lanes now)

The decision making step 324 may process all of the information incoming from all sources in order to derive substantially new information that is associated with or comprises decision making, for example:

logic—deriving conclusions from other information, typically by the processes of logical inference, deduction, resolution etc. (e.g. proposed lane change is rejected due to incoming veto)

deliberation—weighing numerous alternatives in order to choose one of them (e.g. first vehicle cannot speed up so second vehicle should slow down)

The behavior execution step 328 may process all of the information incoming from all sources in order to derive substantially new information that is associated with or causes acting in the real world, for example:

notification—creating events (e.g. messages) for consumption in another part of the system (e.g. lane change maneuver commencing now)

action—maintaining or altering the motion of the vehicle (e.g. execution of emergency braking maneuver.

1.4. Shared World Model

In FIG. 8, the ellipses 330, 332, 334 indicate some components of the shared world model 240. The shared world model 240 is used as a diverse data repository that is both the source of relevant information for some algorithms, and the repository for results for other (or the same) algorithms. In general, any processing step may read information from or write information to any component. As mentioned above, each vehicle has its own local copy 126 of the shared world model 240 and processes attempt to keep them somewhat up-to-date and consistent. In this way, processes on any one vehicle are effectively reading and writing information to the shared world models of all vehicles.

The shared world model 240 comprises all information that is shared. In FIG. 3, it was depicted as being divided into three components 330, 332, 334 for convenience of explanation but there can be more or fewer components (such as state prediction 321 described below) and the distinctions between only serve to help elaborate the different ways in which vehicles may collaborate. In an example embodiment, the shared information contains:

State model—information that relates to the properties, attributes, etc. of all objects of interest, both internal and external to the vehicle formation. For example, this component comprises aspects of "where everything is and how it is moving".

Situation model—information that relates to description of the situation. For example, this component comprises aspects of "what is happening".

Decision model—information that relates to decisions to taking or not taking actions. For example, this component comprises aspects of "what to do".

As depicted in the example data flow diagram of FIG. 4, each vehicle 110-H or 110-A has a controller 120, local model 126, perception and state estimation 320, state prediction 321, situation assessment 322, decision making 324, shared world model 240, model propagation 280, model rendering 290, and vehicle to vehicle communication 295 components. Sensors 112 feed the perception and state estimation 320 and state prediction 321 components that make up the local model 126. The content of the local model 126 is used to develop the local copy of the shared world model 240 which is in turn shared with other vehicles 110 via the model propagation function 280. Constraints, preconditions and possible actions 260 are input to decision making 324 along with outputs from situation assessment 322, which in turn drive the controller 120. Model rendering 290 feeds a user interface.

Collaborative Autonomy Transition Behavior Enabled by Shared Information

Given the context of shared information stored in a shared world model 240, it can now be understood how such shared information can be used to implement collaborative behaviors such as a convoy vehicle's transitions into or out of autonomy mode.

FURTHER IMPLEMENTATION OPTIONS

It should be understood that the example embodiments described above may be implemented in many different ways. In some instances, the various "data processors" may each be implemented by a physical or virtual general purpose computer having a central processor, memory, disk or other mass storage, communication interface(s), input/output (I/O) device(s), and other peripherals. The general-purpose computer is transformed into the processors and executes the processes described above, for example, by loading software instructions into the processor, and then causing execution of the instructions to carry out the functions described.

As is known in the art, such a computer may contain a system bus, where a bus is a set of hardware lines used for data transfer among the components of a computer or processing system. The bus or busses are essentially shared conduit(s) that connect different elements of the computer system (e.g., one or more central processing units, disks, various memories, input/output ports, network ports, etc.) that enables the transfer of information between the elements. One or more central processor units are attached to the system bus and provide for the execution of computer instructions. Also attached to system bus are typically I/O device interfaces for connecting the disks, memories, and various input and output devices. Network interface(s) allow connections to various other devices attached to a network. One or more memories provide volatile and/or non-volatile storage for computer software instructions and data used to implement an embodiment. Disks or other mass storage provides non-volatile storage for computer software instructions and data used to implement, for example, the various procedures described herein.

Embodiments may therefore typically be implemented in hardware, custom designed semiconductor logic, Application Specific Integrated Circuits (ASICs), Field Programmable Gate Arrays (FPGAs), firmware, software, or any combination thereof.

In certain embodiments, the procedures, devices, and processes described herein are a computer program product, including a computer readable medium (e.g., a removable storage medium such as one or more DVD-ROM's, CD-ROM's, diskettes, tapes, etc.) that provides at least a portion of the software instructions for the system. Such a computer program product can be installed by any suitable software installation procedure, as is well known in the art. In another embodiment, at least a portion of the software instructions may also be downloaded over a cable, communication and/or wireless connection.

Embodiments may also be implemented as instructions stored on a non-transient machine-readable medium, which may be read and executed by one or more procedures. A non-transient machine-readable medium may include any mechanism for storing or transmitting information in a form readable by a machine (e.g., a computing device). For example, a non-transient machine-readable medium may include read only memory (ROM); random access memory (RAM); storage including magnetic disk storage media; optical storage media; flash memory devices; and others.

Furthermore, firmware, software, routines, or instructions may be described herein as performing certain actions and/or functions. However, it should be appreciated that such descriptions contained herein are merely for convenience and that such actions in fact result from computing devices, processors, controllers, or other devices executing the firmware, software, routines, instructions, etc.

It also should be understood that the block and system diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and thus the computer systems described herein are intended for purposes of illustration only and not as a limitation of the embodiments.

The above description has particularly shown and described example embodiments. However, it will be understood by those skilled in the art that various changes in form and details may be made therein without departing from the legal scope of this patent as encompassed by the appended claims.

The invention claimed is:

1. A system for controlling an autonomy system of a vehicle comprising:
   a human-operable input device including one or more of a throttle, brake or steering input providing human control inputs;
   one or more processors storing one or more computer programs that include computer instructions, which when executed by the one or more processors cause the one or more processors to provide autonomy control inputs based on autonomy logic, the autonomy control inputs including one or more of a throttle, brake or steering input, wherein the one or more processors are further configured to generate an autonomy ready signal indicating readiness of the autonomy logic to generate autonomy control inputs;

one or more electronic actuators configured to operate one or more corresponding vehicle sub-systems and to provide an actuator ready signal indicating operating status of the one or more electronic actuators;

a human-operable mode input device providing a requested mode signal;

a controller for selecting either a human driving mode or an autonomy driving mode that respectively provide the human control inputs or the autonomy control inputs to operate the vehicle sub-systems, wherein selection of the human driving mode or autonomy driving mode depends on a state of the mode signal, a state of the autonomy ready signal, and a state of the actuator ready signal; and an output device providing one or more outputs indicating the human driving mode or autonomy driving mode.

2. The system of claim 1 wherein:

the autonomy logic further comprises an A-kit module configured to generate a desired travel plan;

a B-kit module that controls one or more steering, brake and/or throttle actuators of the vehicle based on the desired motion;

and wherein the controller has logical states including:

a pre-disarm state, wherein the B-kit is enabled but not yet ready to be active, and the A-kit is disabled and inactive, such that the human control inputs directly control the actuators;

a disarm state where the B-Kit is enabled and ready to be active but the A-kit is disabled such that human control inputs directly control the actuators;

an arm state where the B-kit is enabled and active, and the A-kit is enabled to track human control to control the actuators in response;

a ready for autonomy state where the B-kit is enabled and active, and A-Kit is enabled to enter a full autonomy state, but still controls the actuators via the human control inputs;

a full autonomy state where the vehicle is autonomously controlled by the B-Kit as directed by the A-Kit and the human control inputs do not control the actuators; and an e-stop state where the A-Kit and B-kit are deactivated and disabled.

3. The system of claim 2 wherein in the arm state:

a throttle relay is powered up and connects a throttle pedal to an Electronic Control Unit (ECU) through the controller;

the controller reads the throttle pedal signals, and generates the output signal that is sent to the ECU, to permit throttle pedal control while demonstrating that the autonomy logic is functional;

the B-Kit enables communication over a CAN bus; and a Driver Alert System is silent.

4. The system of claim 2 wherein in the arm state, the output device further comprises:

an Arm light that is turned on;

a Disarm, a Ready for Autonomy, and an Autonomy light that are turned off.

5. The system of claim 2 wherein in the autonomy state:

a throttle relay is powered up and connects a throttle pedal to the controller;

the controller ignores the throttle pedal signal;

the controller receives a percentage throttle command from the B-Kit, and generates the output signal that is sent to the ECU;

the B-Kit further enables communication over a CAN bus; and the A-Kit generates data representing a desired travel path and sends that data to the B-Kit;

the B-Kit generates steering, brake and throttle control signals based on the data received from the A-Kit; and a Driver Alert System plays an audible Autonomy enabled message.

6. The system of claim 2 wherein in the autonomy state, the output device comprises:

an Arm light that is turned on;

an Autonomy light that is turned on; and a Disarm and a Ready for Autonomy light are turned off.

7. The system of claim 2 wherein in the disarm state:

a throttle relay is powered up and connects a throttle pedal to an ECU through the controller;

the controller passes the input throttle signals directly to the outputs to an ECU to electronically mimic a wired connection;

the B-Kit inhibits communication over a CAN bus; and a Driver Alert System is silent.

8. The system of claim 2 wherein in the disarm state:

a Disarm light is turned on; and an Arm light, a Ready for Autonomy light, and an Autonomy light are turned off.

9. The system of claim 2 wherein in the e-stop state:

a throttle relay is powered off and set to connect a throttle pedal to an ECU;

Safety Controller, B-Kit, and A-Kit are powered down;

a Disarm light, an Arm light, a Ready for Autonomy light, and an Autonomy light are turned off.

10. The system of claim 2 wherein in the pre-disarm state:

a throttle relay is powered up and connects a throttle pedal to an ECU through the controller;

the controller passes input throttle signals directly to the ECU to electronically mimic a wired connection;

a B-Kit module inhibits communication over a CAN bus; and a Driver Alert System is silent.

11. The system of claim 2 wherein in the pre-disarm state:

a Disarm light, an Arm light, a Ready for Autonomy light, and an Autonomy light are turned off.

12. The system of claim 2 wherein in the Ready for Autonomy state:

a throttle relay is powered up and connects a throttle pedal to an ECU through the controller;

the controller reads the throttle pedal signals, converts them to a percentage throttle, and uses the percentage throttle to generate an output signal that is sent to an ECU, to thereby permit throttle pedal control while demonstrating that the signal generation system that will be used for autonomy is functional; and the B-Kit software enables communication over a CAN bus; and a Driver Alert System repeatedly plays a Ready for Autonomy message with a pause between repeats.

13. The system of claim 2 wherein in the ready for autonomy state:

an Arm light is turned on;

an Amber Ready for Autonomy light is flashing at a slow rate; and a Ready for Autonomy, and an Autonomy light are turned off.

14. The system of claim 2 wherein a transition to the autonomy state is a collaborative decision between the human driver and either autonomy logic or a human driver associated with a second vehicle.

15. A system for enabling collaborative control of at least two vehicles wherein a first vehicle is at least partially controllable by a human driver and a second vehicle is at least partially controllable by autonomy logic, the system comprising one or more processors configured to execute program code stored in one or more memories, which, when executed cause the one or more processors to perform a method comprising:
  collecting information from human driver inputs and outputs on the first vehicle;
  collecting information regarding an autonomy state of at least the second vehicle;
  sharing the resulting collected information between the first and second vehicles;
  each vehicle using the shared information to maintain a world model;
  using the world model to enable the vehicles to collaboratively engage in a decision as a unit to alter an autonomy state of the second vehicle; and
  generating an alert related to the autonomy state of the second vehicle via an apparatus associated with the first vehicle.

16. The system of claim 15 wherein the alert is an audio message.

17. The system of claim 15 wherein the alert is a colored light.

18. The system of claim 15 wherein the decision is for the second vehicle to enter autonomy mode.

19. The system of claim 15 wherein the decision is a result of a driver of the first vehicle requesting to leave autonomy mode.

20. The system of claim 15 wherein the decision is to leave autonomy mode as a result of detecting an unsafe condition of the second vehicle.

21. The system of claim 15 wherein the method further comprises:
  collecting information regarding an unsafe condition from sensors associated with the first and the second vehicle, and
  providing such information regarding an unsafe condition as shared information.

* * * * *